(12) United States Patent
Nicoud et al.

(10) Patent No.: US 6,300,620 B1
(45) Date of Patent: Oct. 9, 2001

(54) OPTICAL SENSOR FOR POINTING DEVICE WITH CONICAL DISKS AND SINGLE PHOTODETECTOR

(75) Inventors: Jean-Daniel Nicoud, Belmont; René Sommer, Renens; Marc Bidiville, Pully, all of (CH)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 09/310,694

(22) Filed: May 5, 1999

(51) Int. Cl.[7] .................................................... G09G 5/00
(52) U.S. Cl. ........................ 250/221; 250/231.13; 345/165
(58) Field of Search ................................ 250/221, 222.1, 250/231.13, 231.14, 231.15, 231.16, 206.1; 345/163, 165, 166, 167

(56) References Cited

U.S. PATENT DOCUMENTS 5,434,594 * 7/1995 Martinelli et al. ................ 345/163
5,559,534 * 9/1996 Lin ...................................... 250/221

* cited by examiner

Primary Examiner—John R. Lee
Assistant Examiner—Kevin Pyo
(74) Attorney, Agent, or Firm—Townsend & Townsend & Crew LLP

(57) ABSTRACT

A method and apparatus for eliminating in at least one light emitter and light detector in a mouse design. This is done by using two conical shaped encoder wheels positioned so that they are almost touching each other. A single light emitter then is used to shine light at the junction, so that it passes through both cones. On the opposite side is a single chip, with two photodetectors integrated on each side. The chip is positioned so that light passing through the first conical encoder impinges on the first photodetector, while light passing through the second conical encoder impinges on the second photodetector. Thus, the two photodetectors can be integrated on a single chip, saving a separate photodetector chip. In addition, only a single LED is required.

15 Claims, 3 Drawing Sheets

OPTICAL SENSOR FOR POINTING DEVICE WITH CONICAL DISKS AND SINGLE PHOTODETECTOR

BACKGROUND OF THE INVENTION

The present invention relates to optical sensors for pointing devices, such as mice and trackballs. In particular, it relates to the reduction of the number of components.

Typically, mice and trackballs have a ball which is either rolled across a desktop when a user moves the mouse, or is manipulated with a user's finger for a trackball. This motion is detected in both the x and y directions by the use of two rollers which are biased against the ball inside the device. The rollers are offset from each other at an angle of 90°. Each roller will typically have a shaft connected to an encoder wheel, which is a wheel with a number of slots. A light emitter, such as a light emitting diode (LED) is mounted on one side of each encoder wheel, with one or more photodetectors on the other side. Multiple photodetectors may be used for differential detection. When the encoder wheel turns, light alternately passes through the slots, and is blocked by the encoder wheel, allowing a determination of the amount of movement of the ball in the x or y direction.

Newer mice and track balls will sometimes include a separate roller wheel which the user can manipulate for scrolling. Such a roller wheel is typically also connected to a separate encoder wheel, which also has an emitter and a detector on either side for determining its movement.

Another typical input for mice and trackballs is one or more buttons to indicate a clicking function. The buttons are typically spring biased to allow the user to depress them, and then have them pop back up. The buttons will typically depress a microswitch mounted beneath the button to provide an input signal. Each button typically has its own microswitch.

One of the challenges in the design of such pointing devices is the reduction of costs and reductions in size, or fitting additional functionality in the same size device. One obvious way to reduce costs is to reduce the number of components required to build the mouse or trackball or other pointing device.

SUMMARY OF THE INVENTION

The present invention provides a method and apparatus for eliminating at least one light emitter and light detector in a mouse design. This is done by using two conical shaped encoder wheels positioned so that they are almost touching each other. A single light emitter then is used to shine light at the junction, so that it passes through both cones. On the opposite side is a single chip, with two photodetectors integrated on each side. The chip is positioned so that light passing through the first conical encoder impinges on the first photodetector, while light passing through the second conical encoder impinges on the second photodetector. Thus, the two photodetectors can be integrated on a single chip, saving a separate photodetector chip. In addition, only a single LED is required.

In a preferred embodiment, encoder wheels are connected to rollers which contact the ball at 90°. The encoders are conically shaped with a cone angle of 45°. The semiconductor chip with the photosensors is mounted in the vertical plane tangent to both conical shaped encoders. The encoders alternately block and let light pass through as they rotate with their respective roller.

In an alternate embodiment, a controller or application specific integrated circuit (ASIC) for the pointing device can also be integrated on the same semiconductor chip as the photosensor. This further reduces the part count by combining these two chips into one.

In an additional embodiment, a light pipe can be used to direct light to a third sensor on the semiconductor chip, thus eliminating another photosensor chip. The third sensor could be used to detect light passing through an encoder wheel connected to a roller for scrolling. Alternately, light could be used to detect the depression of a button, rather than the microswitch. Thus, one or more light pipes can connect to multiple sensors on the same chip.

For further understanding of the nature and advantages of the invention, reference should be made to the following description taken in conjunction with the accompanying drawings.

DESCRIPTION OF THE SPECIFIC EMBODIMENTS

Figure 1:
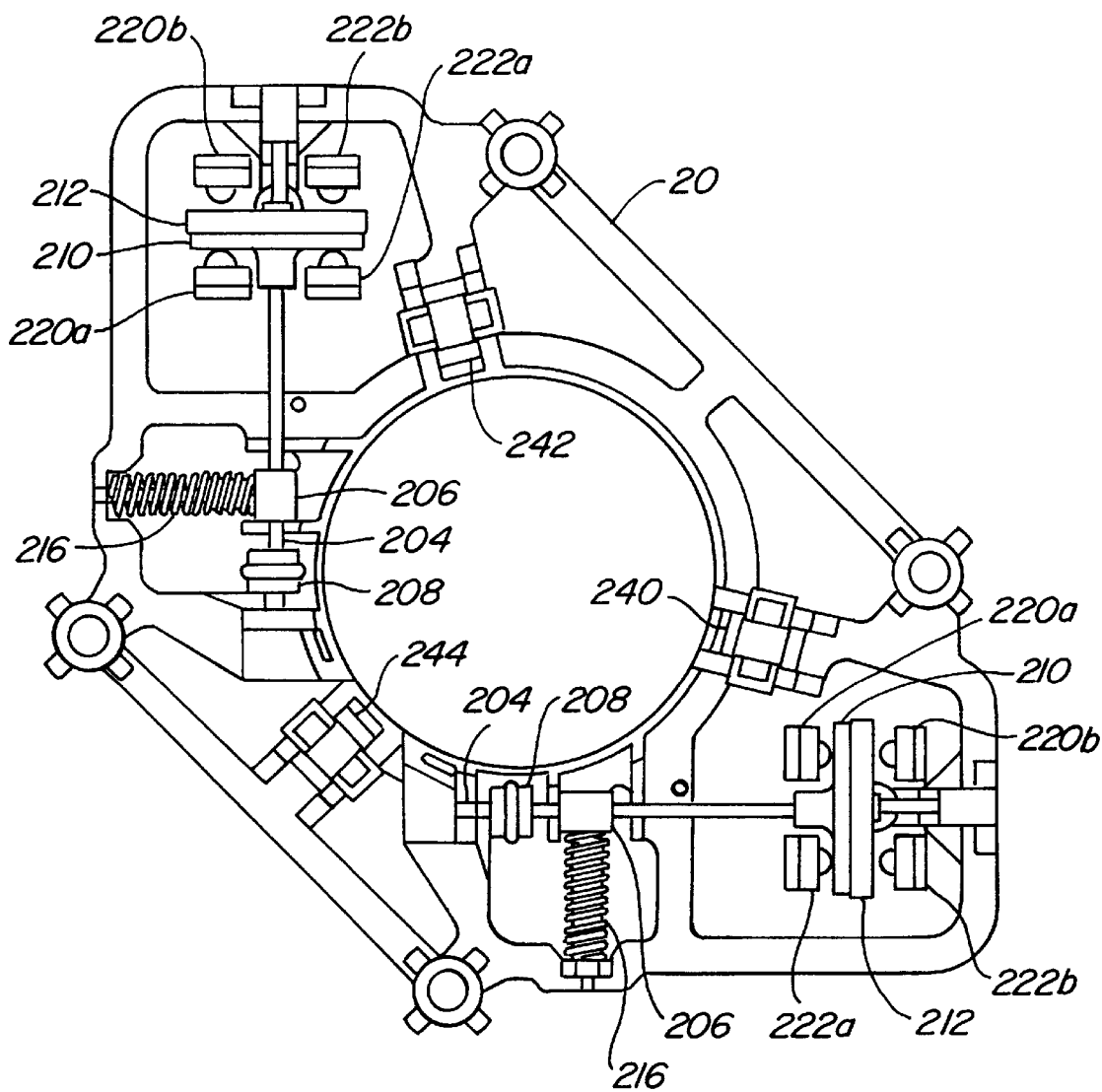
FIG. 1 is a diagram of a prior art mouse design illustrating the use of rollers and encoder wheels.

FIG. 1 is a diagram of an older prior art design for trackball components. A similar design, with respect to areas of interest in this application, is used for a mouse. As will be discussed below, current designs typically eliminate a number of the components set forth in FIG. 1.

Referring to FIG. 1, the skeleton 20 of a trackball is shown in plan view. Mounted on the skeleton are all of the mechanical elements of a pair of optomechanical encoders. The mechanical elements of each encoder include a shaft 204 mounted within a positioner 206 and an engagement wheel 208. Mounted on the shaft is an encoding wheel 210, which has slits in it for the selective passage of light.

The shaft 204 passes through a mask 212, which permits the mask to be juxtaposed next to the encoding wheel 210. The mask 212 may be seen to include slits, opposed at a suitable angle. A post on the mask 212 engages a receiver on the skeleton 20, which serves to position rotatably one end of the shaft 204. The other end of the shaft 204, bearing the engagement wheel 208, is retained within a slotted receiver (another of which also limits the range of movement of the other end of the shaft 204). The engagement wheel is urged into frictional contact with the ball by means of spring 216, which extends between a positioning pin 206 on the shaft 204 and an opposing positioning pin on the skeleton 20.

The encoding wheel 210 and mask 212 are positioned between a pair of photo sources and photodetectors 220a–b and 222a–b which are affixed to a printed circuit board. The movement of the ball in engagement with the wheels 208 causes the encoding wheel 210 to rotate relative to the fixed slits in the mask 212, so that the photodetectors 220b and 222b generate a quadrature signal, which may be readily converted to a digital signal indicative of movements by a manner well known in the art.

In a trackball configuration, to ensure smooth rotation of the ball, three pressure rollers 240, 242 and 244 are provided. The rollers 240–244 may be of the shaft-mounted ball bearing type, and provide improved shock loading. The ball rests on the rollers 240–244, and thus does not frictionally engage the opening in the skeleton 20. In other embodiments, however, where such shock loading is not required, it may be desirable to eliminate the pressure rollers 240–244 and to permit direct engagement of the ball with the skeleton 20.

As noted above in connection with the photo sources and photodetectors 220a–b, the skeleton 20, once assembled, is located over the printed circuit board assembly. The PCB, in addition to holding the photo sources and photodetectors also supports a connector by which the trackball may be electronically connected to a personal computer or workstation (not shown). The PCB may also hold a suitable processor or other electronics to manipulate the quadrature signals generated by the photodetectors 220b and 222b. A suitable sensing circuit is used.

In more modern designs, the three pressure rollers are eliminated, instead using a single pressure roller opposite a mid-point of the two encoder rollers. In addition, the masks are typically eliminated, instead using dual or quad photodetectors for differential detection (see, for example, U.S. Pat. No. 5,680,157, incorporated herein by reference). In addition, instead of using the skeleton 20, the support structures may be integrated into the bottom housing of the trackball or mouse (see, for example, U.S. Pat. No. 5,670,990). All of these innovations have contributed to the reduction of components and reduction of costs of mice, trackballs, and other pointing devices.

Figure 2:
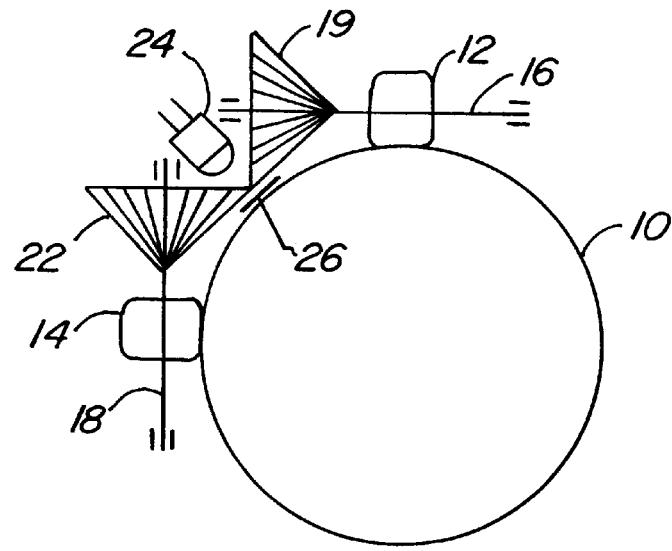
FIG. 2 is a diagram of the conical encoders according to the present invention.

FIG. 2 is a diagram of one embodiment of the present invention. A trackball or mouseball 10 is shown, with two rollers 12 and 14 biased against it at 90° from each other. The rollers are connected to shafts 16 and 18, respectively. The ends of the shafts are connected to encoder wheels 19 and 22, respectively.

Each of the encoder wheels, instead of being a disk, is cone-shaped. This conical shape allows the placement of a light emitting diode 24 at a position where light from it will pass through portions of both cones. On the opposite side of the cones from the light emitting diode is a photodetector chip 26.

Figure 3:
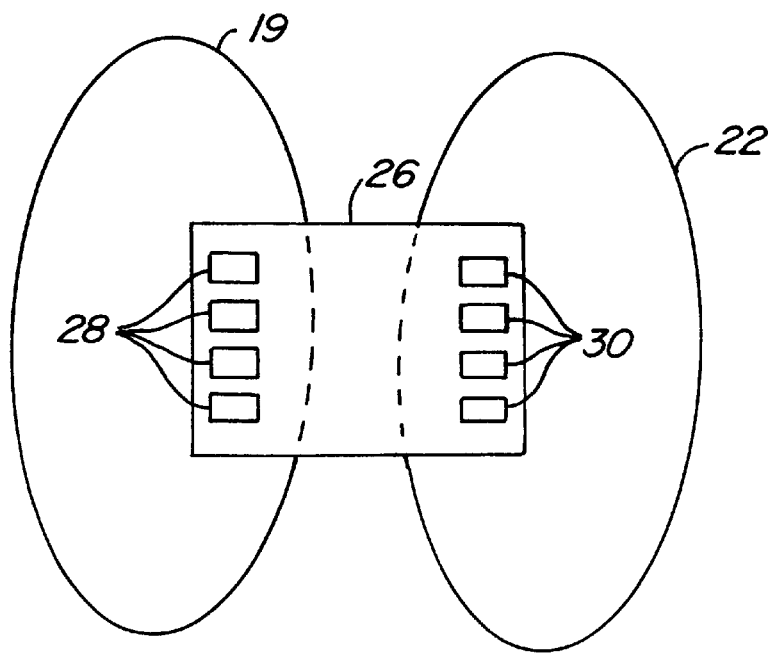
FIG. 3 is a diagram illustrating the positioning of the photosensors behind the conical encoders of FIG. 2.

FIG. 3 illustrates the positioning of semiconductor chip 26 in more detail. As can be seen, a quad photosensor having four photodetector elements 28 is positioned opposite conical encoder 19. Similarly, a quad photosensor having four photodetector elements 30 is positioned opposite conical encoder 22. Alternately, a dual or other photodetector configuration could be used.

The conical encoder wheels can be slotted disks, like the prior art, which are formed in a cone shape of plastic. As shown, preferably the cones have an angle of 45°, such that the two sides of the cone form a tangent to ball 10, and are also are tangent to the vertically aligned photosensor chip 26. However, this is not necessary, and other angles could be used as well. As used herein, the term "conical" is intended to refer to any curved shape which is not a flat slotted disk.

In one embodiment, the conical encoders can be made up of a transparent structure that concentrates the light from the LED in some areas, and removes it in others. Thus, a pattern similar to that which is obtained from a classical slotted disk can be produced. Any number of transparent materials could be used for the conical encoder, such as Polycarbonate, for example. In one embodiment, the conical disk and it's shaft are molded as a single piece of the same material.

Figure 4:
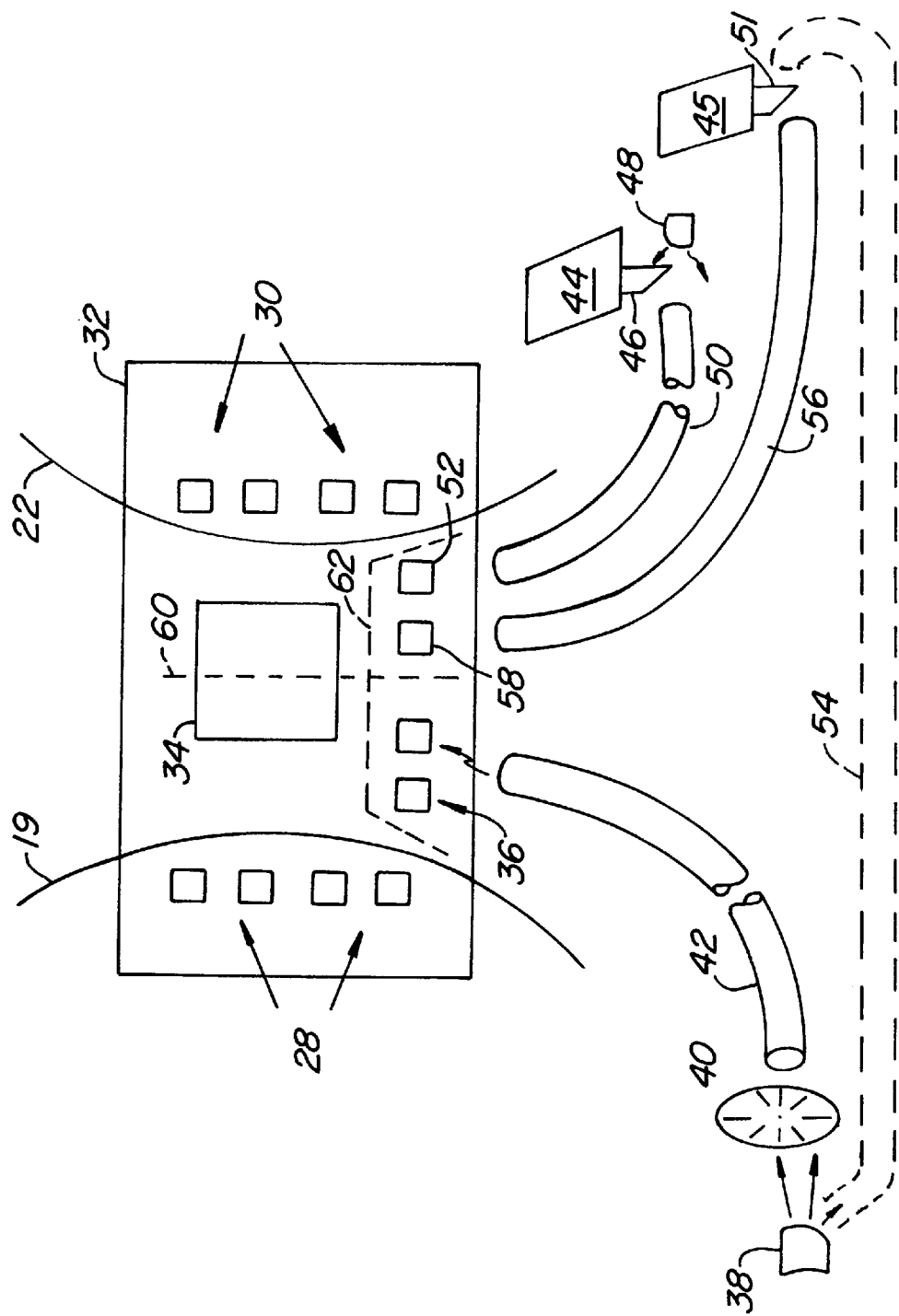
FIG. 4 is a diagram illustrating the use of light pipes in an alternate embodiment of the invention.

FIG. 4 illustrates an alternate embodiment of the invention in which a sensor chip 32 includes photosensors 28 and 30, but also includes a controller circuit 34. Controller circuit 34 can be a microprocessor, a controller, or an ASIC used for controlling functions of the pointing device. By grouping the sensors and the controller on the same chip, not only is there less space required for components, and fewer components (fewer chips), but also less interconnection is needed. For example, the output buffers and pads normally on a separate sensor chip are eliminated, as well as the input pads and protection circuits normally on a controller chip which connects to the sensor chips.

FIG. 4 also shows a separate set of photosensors 36. A separate LED 38 may provide light through an encoder wheel 40 connected to a roller for scrolling, for instance. On the other side of encoder wheel 40 is a lightpipe 42, which provides the light to sensor 36. Thus, for functional purposes, it is as if the sensors 36 are physically on the opposite side of encoder wheel 40, as in existing devices. This thus allows the elimination of another photosensor chip in the design. In one embodiment, a separate light pipe is used for each photodiode in the device, including the ones discussed below.

In yet another alternate embodiment, two buttons 44 and 45 are shown. Button 44 has a fin 46 which extends below it, and normally does not block light generated by an LED 48 and received by lightpipe 50, and transmitted to a sensor 52 on chip 32. When button 44 is depressed, however, fin 46 blocks the light from LED 48, providing a dark image to photosensor 52, which then can detect a button depression.

A similar method can be used for button 45 with its fin 51. Alternately, instead of a separate LED, an additional lightpipe 54 providing the light from either LED 48 or LED 38 can be used. Lightpipe 54 could be Y-shaped to provide light to a second location. Fin 51 similarly will block the light, which is received by lightpipe 56 and is provided to a sensor 58 on semiconductor chip 32. In one embodiment, sensor 58 is a dual sensor to make the design less sensitive to component variation and provide a more precise switching point.

Alternately, a single LED or other light emitter could be used for the entire pointing device, with one or more lightpipes directing that light to the various encoder wheels where it is needed, or to the button fins.

In yet another alternate embodiment, shunt barriers 60, 62 indicated by dotted lines on photosensor chip 32, could be placed to avoid light from one lightpipe or from LED 38 impinging on the wrong photosensors. Shunt barriers 60, 62 could simply be a piece of opaque plastic which protrudes slightly from the surface of the chip, and is simply glued onto the surface of the chip or mounted adjacent to it. Shunt barriers 60, 62 could be formed integral with the lower housing of the mouse or trackball, for example. Alternately, shunt barriers 60, 62 could be replaced with a simple vertical piece of plastic which has holes at the appropriate position for light to penetrate to the desired photodetectors. Thus, it would block most of the area of chip 32, but have openings above sensors 30 and 28, for example.

As will be understood by those of skill in the art, the present invention may be embodied in other specific forms without parting from the essential characteristics thereof. For example, the conical encoders, instead of having a straight edge, could be curved, to have the shape more like that of a half sphere. Alternately, other shapes could be used. In addition, instead of using a spring-biased pressure roller, the shafts of the conical disks could be spring-biased against the ball, with the pressure roller instead being fixed. Accordingly, the foregoing disclosure is intended to be illustrative, but not limiting, of the scope of the invention which is set forth in the following claims.

What is claimed is:

1. An input device having a movable ball and having two rollers biased against said ball, comprising:
   a first conical shaped encoder connected to said first roller;
   a second conical shaped encoder connected to said second roller;
   a light emitter mounted on a first side of said first and second encoders; and
   first and second light sensors mounted on a single semiconductor chip on a second side of said first and second encoders, and positioned such that light from said light emitter passes through said first encoder to said first sensor, and through said second encoder to said second sensor.

2. The input device of claim 1 wherein said encoders alternately block and let light pass through as they rotate with said respective roller.

3. The input device of claim 1 wherein said single semiconductor chip is mounted in a vertical plane tangent to both said conical shaped encoders.

4. The input device of claim 1 wherein said first and second rollers contact said ball at two points 90 degrees apart.

5. The input device of claim 1 wherein said conical shaped encoders are conical with an angle of 45 degrees from a shaft connecting each to a respective one of said first and second rollers.

6. The input device of claim 1 further comprising a controller for said input device mounted on said semiconductor chip with said light sensors.

7. The input device of claim 1 wherein said encoders comprise transparent structures configured to concentrate light from said light emitter in some areas and remove it from other areas.

8. The input device of claim 1 wherein said semiconductor chip is mounted on a flexible transparent foil, with the foil having conductive traces on a side having said chip mounted thereon, with light from said light emitter penetrating said foil to contact said light sensors.

9. The input device of claim 1 further comprising:
   a third sensor on said semiconductor chip; and
   a light pipe directing light from another control input to said third sensor.

10. The input device of claim 9 wherein said third sensor comprises a roller coupled to a third encoder, said light pipe originating on a side of said third encoder opposite a second light source.

11. The input device of claim 9 wherein said third sensor comprises a switch activatable by a button on said input device.

12. The input device of claim 1 wherein said input device comprises a mouse.

13. The input device of claim 1 wherein said input device comprises a trackball.

14. An input device having a movable ball and having two rollers biased against said ball, comprising:
   a first conical shaped encoder connected to said first roller;
   a second conical shaped encoder connected to said second roller;
   a light emitter mounted on a first side of said first and second encoders;
   first and second light sensors mounted on a single semiconductor chip on a second side of said first and second encoders, and positioned such that light from said light emitter passes through said first encoder to said first sensor, and through said second encoder to said second sensor;
   wherein said encoders alternately block and let light pass through as they rotate with said respective roller;
   wherein said single semiconductor chip is mounted in a vertical plane tangent to both said conical shaped encoders;
   wherein said first and second rollers contact said ball at two points 90 degrees apart; and
   wherein said conical shaped encoders are conical with an angle of 45 degrees from a shaft connecting each to a respective one of said first and second rollers.

15. The input device of claim 14 further comprising first and second springs biasing said rollers against said movable ball.

* * * * *